United States Patent [19]

Bloys et al.

[11] Patent Number: 5,065,820

[45] Date of Patent: Nov. 19, 1991

[54] CONTROL OF LOST CIRCULATION IN WELLS

[75] Inventors: James B. Bloys, Plano; Bonsall S. Wilton, McKinney, both of Tex.

[73] Assignee: Atlantic Richfield Company, Los Angelels, Calif.

[21] Appl. No.: 594,252

[22] Filed: Oct. 9, 1990

[51] Int. Cl.$^5$ ............................................. E21B 33/138
[52] U.S. Cl. .................................. 166/291; 166/294; 175/72; 252/8.551
[58] Field of Search ...................... 166/291, 294, 305.1, 166/282, 283; 252/8.512, 8.515, 8.551, 72; 175/72

[56] References Cited

U.S. PATENT DOCUMENTS

| | | | |
|---|---|---|---|
| 2,259,875 | 10/1941 | Bent et al. | 175/72 X |
| 2,342,588 | 2/1944 | Larkin | 175/72 X |
| 3,208,523 | 9/1965 | Coyle et al. | 175/72 X |
| 3,566,968 | 3/1971 | Marx | 166/294 |
| 3,876,006 | 4/1975 | Messenger | 175/72 X |
| 4,173,999 | 11/1979 | Messenger | 175/72 X |
| 4,635,726 | 1/1987 | Walker | 175/72 X |
| 4,989,673 | 2/1991 | Sydansk | 175/72 X |

Primary Examiner—George A. Suchfield
Attorney, Agent, or Firm—Drude Faulconer

[57] ABSTRACT

A method and a treating mixture for controlling lost circulation of fluid from a wellbore to a formation wherein the treating mixture is flowed down the wellbore to block flow into the formation. The mixture is comprised of a non-aqueous carrier liquid (e.g. diesel) and particles of compressed sponge) which expands upon contact with an aqueous liquid in the formation. The mixture may also contain a second lost circulation material (e.g. unhydrolyzed polyacrylamide) which hydrates to bridge and plug any voids or spaces left between the expanded sponge particles. When used to control lost of an aqueous liquid, e.g. water-based mud, a non-aqueous liquid (e.g. diesel) is used ahead and behind the treating mixture to separate it from aqueous liquids. When used to control loss of an oil-based liquid, water is pumped behind the treating mixture to provide the aqueous liquid necessary for expanding the sponge particles once they are in place.

12 Claims, No Drawings

CONTROL OF LOST CIRCULATION IN WELLS

TECHNICAL FIELD

The present invention relates to the control of lost circulation of fluids to a formation during the drilling and/or completion of a well and in one of its aspects relates to a control of lost circulation wherein a treatment mixture is used which is comprised of a non-aqueous carrier liquid and a sponge-like material which expands upon contact with water within the formation to thereby effectively seal off the formation to further loss of fluids.

BACKGROUND ART

The term "lost circulation" (or lost returns) is normally used to refer to a situation where substantial amounts of whole drilling and/or completion fluids (e.g. cements) and not just filtrate are lost to a highly permeable, fractured, or cavernous formation during the drilling and/or completion of a well. When lost circulation occurs, the fluid losses can range from a slow seepage to a complete loss of the fluid column in the wellbore. As is readily recognized in the art, lost circulation can be very difficult to control and the expense involved is usually substantial.

When lost circulation occurs, various materials are routinely pumped down the wellbore and into the permeable flow passages (e.g: fractures) in the formation in an attempt to bridge across and form a fluid barrier in these passages. By forming a barrier across the passages, flow is blocked therethrough which, in turn, prevents further propagation of the tip of the passage into the formation. Once the flow passages in the formation have been effectively bridged and/or blocked, full circulation of the fluids in the wellbore can be reestablished.

Where lost circulation fluid losses are small, it is common in the art to treat the lost circulation zone with fibrous, flake, or granular materials which are commercially-available and which are designed to help plug the passages in the formation. Where the losses are large, it is common to treat the loss circulation zone with "gunk" squeezes, polymers, calcium silicate gels, cements, etc..

While each of the above-described, prior-art treatments have proved successful in controlling lost circulation problems in the particular applications for which they were designed, no one material or treatment has been found to work in every lost circulation situation. Accordingly, the search continues for new, low-cost lost circulation treatments and materials.

DISCLOSURE OF THE INVENTION

The present invention provides a method and a treating mixture for controlling lost circulation of fluid from a wellbore into passages of a formation penetrated by the wellbore wherein the treating mixture is flowed down the wellbore and into the passages to block further flow therethrough. The mixture is comprised of a non-aqueous carrier liquid (e.g. diesel, mineral oil, crude oil, and the like) and particles of a first lost circulation material which expands upon contact with an aqueous liquid in the formation passages. The first lost circulation material is particles of cellulose sponge which has been compressed several times its expanded volume and which remains compressed in the non-aqueous carrier liquid.

While the present treating mixture may only contain the first lost circulation material of sponge particles, a second lost circulation material selected from well-known lost circulation materials also may be mixed therein. For example, chips of unhydrolyzed polyacrylamide can be mixed in the treating mixture which hydrate when contacted by water to swell many times their original volumes to thereby form a soft plug in spaces between the expanded sponge particles. The present treating mixture can also be formed by mixing the sponge particles into other previously-known lost circulation treating mixtures, e.g. "gunk" squeezes, high filter-loss slurry squeezes, etc..

Where the present invention is used to control lost circulation in a well using an aqueous liquid (e.g. water-based mud, cement, etc.), a non-aqueous liquid (e.g. diesel) is flowed down the wellbore before the treating mixture to separate the treating mixture from the aqueous liquid until the treating mixture reaches the formation. This prevents premature expansion of the sponge particles during placement.

Where an non-aqueous liquid (e.g. an oil-based mud) is being lost in a well, water is pumped after the treating mixture to provide the aqueous liquid necessary to expand the sponge particles once the treating mixture is placed in the formation.

BEST KNOWN MODE FOR CARRYING OUT THE INVENTION

As is well known, fluids are normally circulated within a wellbore while a well is being drilled and/or completed. For example, in drilling a well, "mud" is normally circulated down the drill string, out the bit, and back to the surface through the annulus between the drill string and the wall of the wellbore to perform a host of different functions, e.g. carries the drill cuttings to the surface, balances the formation pressures to prevent blow-outs, cools the bit, etc.. In completing a well, cement is typically circulated within the wellbore in a similar manner to cement the well casing in place.

In drilling and/or completing a well, it is not uncommon for the wellbore to penetrate a formation which is extremely permeable (i.e. 10–100 darcies) due to some natural or induced condition, e.g. shallow sand and gravel formations, natural or induced fractured formations, cavernous formations, etc.. As used herein, these formations will be referred to collectively as "lost circulation formations" or the "lost circulation zone". When such a formation is penetrated, at least some of the whole drilling mud or cement does not return to the surface through the annulus but instead, it flows outward into the flow passages (e.g. fractures) in the permeable formation and is lost thereby creating a "lost circulation" situation. The loss of this mud or cement, in addition to creating other problems, is very expensive and adds substantially to the cost of the well.

In accordance with the present invention, a lost circulation treatment method is provided wherein a treating mixture is pumped down the wellbore and into the permeable passages within the lost circulation formation to bridge these passages and block further flow therethrough. The treating mixture is comprised of a non-aqueous carrier liquid and a sponge-like material which will expand upon contact with water. As the sponge-like material contacts aqueous fluids within the formation, it expands to form a barrier across the respective passages thereby blocking further flow therethrough. Once the material forms a barrier across the passages, full circulation in the wellbore can be re-established.

More specifically, the treating mixture of the present invention is comprised of a non-aqueous carrier liquid and particles of compressed sponge which will expand upon contact with an aqueous fluid. The carrier liquid may be any practical non-aqueous (no water) liquid which would suggest itself in the drilling/completion art and is preferably selected from one of the following: diesel, mineral oils, crude oil, polyglycols, glycerols, and the like.

The compressed sponge material to be added to the carrier liquid is one which will remain compressed in the non-aqueous carrier liquid but will expand when contacted by an aqueous fluid, i.e. one containing water. Preferably, it is comprised of chips or small blocks (hereinafter collectively called "particles") of cellulose sponge of the type commonly used for household cleaning and the like. The sponge is compressed several times from its normal expanded volume (e.g. 10-12 times). Such sponge material is well known and is commercially available in its compressed state; "HydraSponge" from Hydra Sponge Co., Senton, Mo.

The size of the particles of the lost circulation material will be determined by the size that can be readily pumped in a particular lost circulation situation. That is, preferably, the particles will be as large as possible when taking into consideration the size of particle that can pass through the drill pipe, bit orifices, etc. of the equipment being used in when lost circulation occurs. Likewise, the concentration of particles in a particular carrier liquid will preferably be as great as the situation will allow.

While compressed sponge particles can be used as the sole lost circulation material in the present treating mixture, other well-known lost circulation materials can be included in the treating mixture of the present invention. For example, chips of high molecular weight polymers, e.g. unhydrolyzed polyacrylamide (PA), which are used in other lost circulation treatments can be mixed into the carrier liquid as a second lost circulation material along with the compressed sponge particles. When this mixture is pumped into the passages in the lost circulation formation, the sponge particles will contact the aqueous fluids in the formation and expand many times their compressed volume while the PA hydrates swell many times their volume to form a jellylike mass within any spaces that might exist between the expanded sponge particles thereby further blocking flow therethrough.

One or more other well known lost circulation materials (e.g. fibrous materials, flaked materials, etc.) may be added to the present treating mixture as a second lost circulation material to perform the same functions as that respective second material previously performed in other lost circulation situations. A known fiber or flake material will bridge across any voids or spaces between the expanded sponge particles to improve the barrier formed thereby. It should also be recognized that the present treating mixture may be formed by adding the compressed sponge particles of the present invention to other well-known lost circulation treating mixtures. Such other well-known mixtures include "gunk" squeezes, high filter-loss slurries which use diatomaceous-earth or the like, downhole-mixed soft/hard plugs, etc.. For a more complete description of these and other well-known lost circulation methods and materials, see "LOST CIRCULATION", J. U Messenger, PennWell Books, PennWell Publishing Co., Tulsa, Okla., 1981.

When the present invention is used to control lost circulation in a well being drilled and/or completed with an aqueous fluid (e.g. water-base drilling mud, cement, etc.), it may be necessary to separate the treating mixture from the aqueous fluid until the treating fluid has been placed into the lost circulation formation in order to keep the compressed material from expanding prematurely in the well tubular. To do this, a small slug of a non-aqueous liquid (e.g. diesel or the like) is used to separate the mixture from the aqueous liquid in the tubular. The diesel slug is pumped down the drill pipe or cement string ahead of the treating mixture to force the aqueous liquid out of the respective tubular and into the annulus and/or formation. As the treating mixture reaches the bottom of the tubular, aqueous liquid, e.g. water-based mud, can be pumped down the annulus so that it mixes with the treating mixture as both enter the formation. Upon mixing with the aqueous liquid, the compressed sponge particles expand to effectively seal off the formation. Further, since only a relatively small volume of treating mixture may be required, a second slug of the non-aqueous liquid (e.g. relatively inexpensive diesel) can be placed in the tubular behind the treating mixture to finish filling the tubular during the pumping and placement of the treating mixture.

When the present invention is used to control lost circulation in a well which is being drilled and/or completed with an oil-based liquid, it may be necessary to supply the aqueous fluid, e.g. water, which is required to expand the sponge particles within the formation. To do this, preferably the treating mixture is first pumped into the formation where the sponge particles are "strained" out in the passages of the formation. Water, separated by a small slug of diesel or the like, is then pumped down the tubular behind the treating mixture and into the formation where it contacts the sponge particles trapped in the passages to expand same as described above.

What is claimed is:

1. A method of controlling lost circulation of fluid from a wellbore into passages of a formation penetrated by said wellbore, said method comprising:
    flowing a treating mixture down said wellbore and into said passages of said formation, said treating mixture comprising:
    a non-aqueous carrier fluid;
    a first lost circulation material comprising particles of sponge-like material which expands upon contact with an aqueous fluid; and
    a second lost circulation material.

2. The method of claim 1 wherein said sponge-like material comprises:
    compressed cellulose sponge.

3. The method of claim 2 wherein said non-aqueous carrier liquid is selected from the group of diesel, mineral oil, crude oil, polyglycols, and glycerol.

4. The method of claim 2 wherein said second material comprises:
    unhydrolyzed polyacrylamide.

5. The method of claim 1 including:
    flowing non-aqueous liquid down said wellbore before flowing said treating mixture down said wellbore to displace any aqueous fluids ahead of said treating mixture.

6. The method of claim 1 including:
flowing an aqueous liquid down said wellbore and into said formation after flowing said treating mixture down said wellbore to provide an aqueous liquid in said formation to expand said compressed sponge particles.

7. The method of claim 6 including:
flowing non-aqueous liquid down said wellbore between said treating mixture and said aqueous fluid to separate said treating mixture from said aqueous liquid until said treating mixture reaches said formation.

8. A mixture for controlling lost circulation of fluids from a wellbore comprising:
a non-aqueous carrier fluid;
a first lost circulation material comprising particles of sponge-like material which expands upon contact with an aqueous fluid; and
a second lost circulation material.

9. The mixture of claim 8 wherein said sponge-like material comprises:
compressed cellulose sponge.

10. The mixture of claim 9 wherein said second material comprises:
unhydrolyzed polyacrylamide.

11. The mixture of claim 9 wherein said second material comprises:
diatomaceous earth.

12. The mixture of claim 8 wherein said non-aqueous carrier liquid is selected from the group of diesel, mineral oil, crude oil, polyglycols, and glycerol.

* * * * *